United States Patent [19]

Condit, Jr.

[11] 4,302,331
[45] Nov. 24, 1981

[54] FILTER BUCKET FOR A FLIGHT CONVEYOR

[76] Inventor: Paul A. Condit, Jr., 1 Sandlilly Ct., The Woodlands, Tex. 77380

[21] Appl. No.: 154,816

[22] Filed: May 30, 1980

[51] Int. Cl.³ .............................................. B01D 35/08
[52] U.S. Cl. .................................. 210/160; 198/713; 210/526; 210/497.01
[58] Field of Search .................. 210/526, 499, 497 R, 210/160; 198/713; 43/6.5

[56] References Cited

U.S. PATENT DOCUMENTS

| | | | |
|---|---|---|---|
| 828,715 | 8/1906 | Cook | 210/499 |
| 1,975,902 | 10/1934 | McConnsyba | 198/713 |
| 2,006,343 | 7/1935 | Brown | 198/713 |
| 2,044,744 | 6/1936 | Hanson | 198/713 |
| 2,638,205 | 5/1953 | Hapmon | 198/713 |
| 2,753,978 | 7/1956 | Kerr | 198/713 |
| 3,891,558 | 6/1975 | Condit, Jr. | 210/526 |
| 3,913,254 | 10/1975 | Puretic | 43/6.5 |
| 4,038,187 | 7/1977 | Saffron | 210/499 |

*Primary Examiner*—Theodore A. Granger
*Attorney, Agent, or Firm*—Bernard A. Reiter

[57] ABSTRACT

An improved filter bucket for a flight conveyor having two sides and a bottom with an integral rake edge. Numerous equally spaced apart arcuately curved wires are fixed to and supported by longitudinally extended cross bars in a grid fashion to form the generally concave bucket bottom interior surface. The wires extend beyond the cross bar at the leading edge of the bucket to form a rake edge for engaging and retaining material conveyed. Perforated sides with numerous holes formed therethrough of diameter equal to the bottom grid spacing wires provide for a uniform filtering action filtering action through the bottom and sides of the bucket.

4 Claims, 4 Drawing Figures

U.S. Patent  Nov. 24, 1981  4,302,331
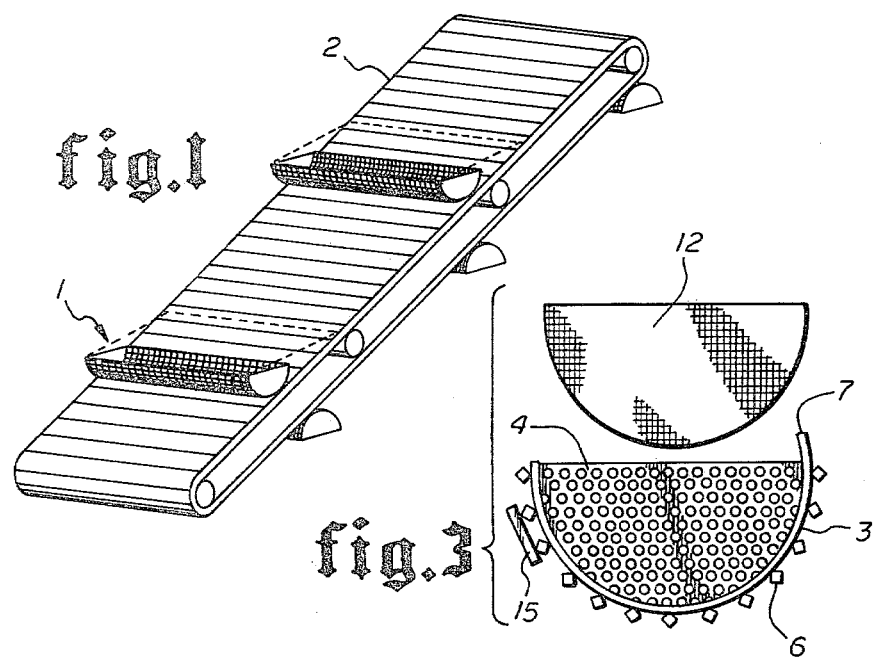
fig.1
fig.3
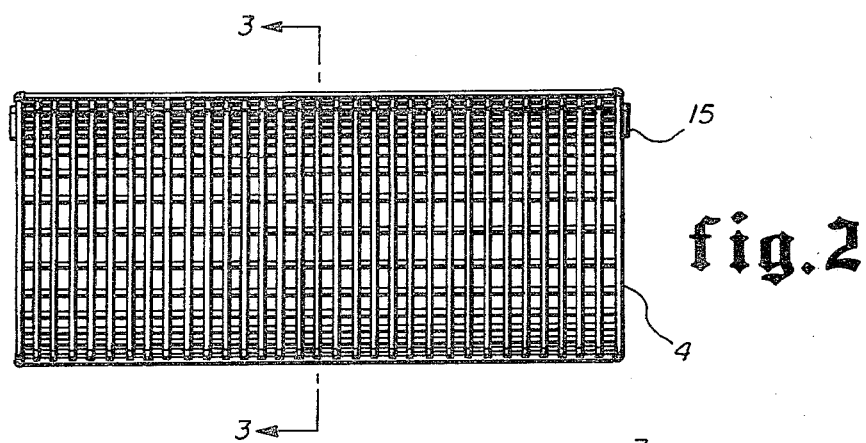
fig.2
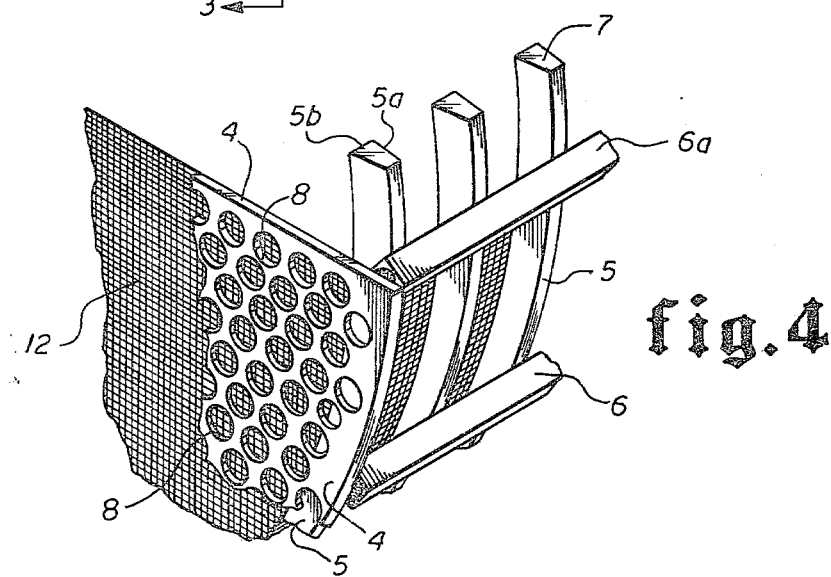
fig.4

4,302,331

FILTER BUCKET FOR A FLIGHT CONVEYOR

FIELD OF THE INVENTION

This invention relates generally to an improved bucket for a flight conveyer in which an endless belt carries numerous buckets for scooping a material to be conveyed. More particularly, this invention relates to an improved bucket for mounting on a flight conveyor which uniformly filters the material as it is conveyed and removes greater volumes of solid material from a liquid than prior buckets.

U.S. Pat. No. 3,891,558, of which the present applicant is inventor, teaches an apparatus for removing oil and debris from water having buckets, or flights, with fluid release slots mounted on an endless conveyor belt. It is often desirable to filter material as it is conveyed, as shown in the U.S. Patent cited above wherein the buckets have slots to allow water to drain while the solid or quasi-solid materials are retained and subsequently dumped from the bucket as waste. Filter buckets are not only useful for separating refuse from liquid, but also for separating waste or scrap material from product, an example of which would be the filtering of dust and other foriegn matter from grain as it is conveyed.

The ability of prior art flights to scoop and retain solid and quasi-solid materials from a liquid is inherently limited. The prior art buckets will rarely retain a volume of material greater than the volume of the bucket due to a "cascade" effect of the liquid mixed with the material. As the conveyor lifts the bucket from the liquid, the liquid cascades and "washes" any solid or solid or quasi-solid material over the sides of the bucket, limiting the capacity of the bucket to its volume. In addition, the materials conveyed will include a substantial amount of liquid, which must drain as the flight is conveyed to be dumped.

SUMMARY OF THE INVENTION

Accordingly, it is an object of the present invention to provide an improved bucket for a flight conveyor for removing solids and quasi-solids from liquid which removes a volume of solids greater than the bucket volume by eliminating the cascading effect of the liquid.

It is a further object of the invention to provide an improved flight bucket for a conveyor system which is light, strong, easy to construct, and performs uniform filtering action on the material conveyed in the bucket.

It is a further object of the invention to provide a filter bucket with an integral and easily manufactured rake-like edge for scooping into, engaging, and retaining the material to be conveyed.

The present invention meets these objectives by providing a filter bucket with a specially designed screen construction. Numerous relatively thin, strong wires are formed in an arcuate screen configuration. The wires are fixed, uniformly spaced apart, to cross bars perpendicular to the wires, to form the concave grid-like bottom of the bucket. The side plates, which may be perforated, are rigidly fixed with the respective ends of the cross bars at each side of the bucket.

A very strong and light bucket is the result. By varying the spacing between the wires and the number of and spacing between the cross bars, a bucket for any desired filtering effect is easily provided. Providing the sides with perforations equal in diameter to the spacing between the wires further enhances uniform filtering action.

Allowing the wires to extend generally upward beyond the edge of the bucket forms a rake-like leading edge on the bucket for digging into and retaining the material to be conveyed.

The above features and advantages of the invention, along with numerous others, will become apparent upon careful reading of the following detailed description, claims, and drawings, wherein like numbers denote like parts in the several views and wherein:

DESCRIPTION OF THE DRAWINGS

FIG. 1 is a perspective view of the filter bucket of the invention mounted with an endless conveyor belt.

FIG. 2 is a top plan view of the filter bucket of the invention.

FIG. 3 is a side plan view of the filter bucket of the invention.

FIG. 4 is a partial perspective view of the construction of the bucket of the invention.

DESCRIPTION OF THE PREFERRED EMBODIMENT

The improved filter bucket of the invention is indicated generally in FIG. 1 at 1 and is mounted with an endless belt 2 carrying numerous identical buckets through a continuous cycle of scooping material, filtering it as it is conveyed upwardly, and dumping it at the upper end of the flight conveyor.

The bucket includes a bottom 3, having a concave inside configuration for retaining the materials scooped, and two sides 4. The bottom 3 comprises numerous, relatively thin and strong stainless steel wires 5 fixed, preferably by welding, to a plurality of relatively thin cross bars 6 perpendicularly disposed to the wires and preferably of the same material. As shown, each wire 5 is formed into an arcuate configuration, however, the cross bars 6 may be welded to straight wires and the resulting screen formed by bending or otherwise into the configuration desired for the bucket bottom.

As best seen in FIGS. 3 and 4, the cross bars are preferably fixed to the wires at the corners of the cross bars to minimize blockage of the screen by the cross bars, and permit liquids to freely drain through the bucket.

The leading edge 7 of the bucket, which scoops into the material conveyed, is preferably rake-like to facilitate engaging with and retaining the material which might otherwise slip out of the bucket. The rake-like leading edge 7 is formed by permitting the ends of the wires 5a to extend beyond the cross bar 6a at the ends of the bucket. It should be noted that the raking action is variable for a particular bucket by varying the number and length of wire ends 5a extending beyond the cross bar 6a at the edge of the bucket. It should be noted that the raking action is variable for a particular bucket by varying the number and length of wire ends 5a extending beyond the cross bar 6a.

The two sides 4 preferably having openings 8 formed through to permit liquids to drain. They may be constructed in a manner similar to the bottom 3 or they may be perforated thin stainless steel plates, as shown, or otherwise. The sides 4 are attached preferably by welding, to the ends of the cross bars 6 to complete the bucket assembly. Holes 8 formed through the end plates permit liquids or debris to filter through the end plates permit liquids or debris to filter through and enhance the filtering action of the bucket. The holes may be of a diameter equal to the spacing between the wires 5 of the bottom to insure uniformity of the filtering action.

Various spacings between the wires 5 and the number of and spacing between the cross bars permits the construction of an endless variety of buckets, each with different filtering characteristics for removal of different size debris. For example, a bucket having relatively few wires is best suited for removing weeds or grass from water and one having many wires and consequently smaller openings through is best suited for removing dust from a grain. Further, the open construction of the bucket allows a stream of air or water, or a suction, to be directed to the contents of the bucket to increase removal of debris.

An additional advantage of the filter bucket of the invention is that its open design and strength make it the ideal vehicle for a screen insert 12, which preferably is the same shape as the bucket to complimentarily friction fit inside and be carried and supported by the bucket. Such a screen may have little strength of rigidity by itself. However, mounting it in the bucket of the invention provides support and permits flow through the screen to freely escape through the bucket. When the filter bucket carries an insert, it is preferable that the wires 4 of the bucket bottom 3 are positioned so that a flat surface abuts the screen. Point stress on the insert is prevented and the chance of breakage or tearing of the insert by the weight of material in the bucket is thus minimized. Such a configuration is shown in FIGS. 3 and 4, where the wires are disposed to present a flat side to any insert placed therein. The wires are preferably generally triangular in cross section, as shown in FIG. 4, where the wires have a truncated triangular cross section. The narrow edge of the wire 5 is fixed with the crossbar 6 and the wider section 5b defines the inside of the bucket and provides a broad support for a screen insert 12.

In use of the filter bucket of the invention, it is typically mounted with an endless conveyor belt 2 by any convenient means shown in the art, such as a bucket 15 mounted with the bucket 1 and belt 2 for example by bolts (not shown). An end of the belt is disposed for example in a body of liquid containing solid or quasi-solid materials, which are desired to be removed. The belt is driven to move the bucket alternately into and out of the liquid to scoop the materials from it and carry them to the opposite end of the belt, where the material is dumped from the bucket. As the bucket of the invention is removed from the liquid, liquids in the material scooped from the liquid freely drain through the openings in the bucket and through the material in the bucket, thereby cascading and washing-off of the material retained above the bucket is prevented. The bucket thus retains material equal to the volume of the bucket and additionally a substantial amount of material is retained above the bucket, as shown by the dotted outline 11 in FIG. 1. In actual operation, when the filter bucket of the invention is used on an inclined conveyor such as the one of FIG. 1 to remove debris from liquids, a volume of material equal to approximately three times the volume of the bucket may be retained.

The filter bucket of the invention is further useful where it is desired to separate dust or refuse from a material. In such case, a stream of air, water, etc. may be directed on the filled bucket as it is conveyed to enhance separation of the undesired material from the material desired to be retained in the bucket. A particular application is in grain elevators, where explosive dust accumulation is a serious problem. The filter bucket of the invention may be employed on a conveyor belt having an enclosure mounted over the belt, and buckets. A suction may be applied to the housing and a strong suction applied adjacent each bucket for removing dust in the grain to prevent its accumulation in the elevator.

In case it is necessary or desirable to change the degree of filtering without removing the filter buckets of the invention from the endless belt. The change is readily accomplished by fitting a suitable insert in each flight bucket. As inserts may be provided having any size openings desired the debris removal, characteristics of the flight buckets are naturally readily and endlessly variable.

It is apparent that there has been provided in accordance with the invention a filter bucket for a flight conveyor that fully satisfies the objects, aims, and advantages set forth above. While the invention is described in connection with specific embodiments thereof, it is evident that many alternatives, modifications, and variations will be apparent to those skilled in the art in light of the foregoing description. Accordingly, it is intended to embrace all such alternatives, modifications, and variations as fully within the spirit and scope of the appended claims.

The invention having been described, what is claimed is:

1. An elongate bucket means for use as a flight step on a moving conveyor for filtering refuse from a liquid medium after moving into and out thereof so as to allow the liquid medium to pass through the bucket while retaining the refuse therein comprising:

a plurality of spaced apart elongate wires extending in substantially parallel manner longitudinally of the bucket means, one of said wires defining a lip on said bucket;

a plurality of elongate wires extending laterally of the longitudinally oriented elongate wires and in fixed contacting relation therewith, said longitudinal and lateral elongate wires disposed in laterally concave configuration;

side means for closing the ends of the bucket means and structurally affixing the longitudinal elongate wires into an integral unitary body; and a plurality of said laterally oriented elongate wires extending beyond the lip of the bucket to define a rake edge on the bucket for engaging and retaining debris contacted by the rake edge.

2. The apparatus of claim 1, including a removable filtering insert adapted to complimentarily fit within said bucket mounted in the bucket, said insert having openings formed therethrough smaller than the spacing between said laterally oriented wires for filtering material from the contents of the bucket whereby the filtering characteristic of the bucket is altered by mounting the insert therein.

,12

3. The apparatus as set forth in claims 1 or 2 wherein said laterally oriented wires are generally triangular in cross section and the basis of said sections are oriented to abut said insert, whereby stresses on said insert are presented.

4. The apparatus as set forth in claim 3, wherein said laterally oriented wires are truncatedly triangular in cross section.

* * * * *